US008774765B2

(12) United States Patent
Thaper

(10) Patent No.: US 8,774,765 B2
(45) Date of Patent: Jul. 8, 2014

(54) SYSTEMS AND METHODS FOR PROVIDING MOBILE HANDSET POSITION TO SOFTWARE APPLICATIONS

(71) Applicant: Cellco Partnership D/B/A Verizon Wireless, Basking Ridge, NJ (US)

(72) Inventor: Atul Thaper, Flemington, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 13/769,151

(22) Filed: Feb. 15, 2013

(65) Prior Publication Data

US 2013/0157622 A1 Jun. 20, 2013

Related U.S. Application Data

(63) Continuation of application No. 12/836,290, filed on Jul. 14, 2010, now Pat. No. 8,391,886.

(51) Int. Cl.
*H04W 12/06* (2009.01)
(52) U.S. Cl.
USPC .............. 455/411; 455/456.1; 455/414.1; 455/456.3

(58) Field of Classification Search
USPC ............. 455/404.1–404.2, 414.1–414.4, 455/456.1–457; 370/328–338; 342/450–453
See application file for complete search history.

(56) References Cited

U.S. PATENT DOCUMENTS

| 7,433,682 B1 * | 10/2008 | Moll et al. ............... 455/414.1 |
| 2004/0224702 A1 * | 11/2004 | Chaskar .................. 455/456.3 |
| 2011/0051658 A1 * | 3/2011 | Jin et al. .................... 370/328 |

* cited by examiner

*Primary Examiner* — Kashif Siddiqui

(57) ABSTRACT

Providing information as to location of a mobile station involves receiving a mobile station location request from a requesting software application at an API gateway of a wireless communications network. The API gateway provides a network-initiated request to the wireless communications network for the location of the mobile station after determining that the requesting application is authorized to receive the location of the specified mobile station. The location of the mobile station can be determined, according to either a coarse or granular location position resolution, or accuracy, based on the request of the application and/or the conditions of the wireless communication network. Information as to location of the mobile station can be produced, and provided to the requesting software application, which can be resident on the mobile station itself or at a different location/platform.

24 Claims, 8 Drawing Sheets

SYSTEMS AND METHODS FOR PROVIDING MOBILE HANDSET POSITION TO SOFTWARE APPLICATIONS

CROSS-REFERENCE TO RELATED APPLICATIONS

This application is a continuation of and claims priority to U.S. application Ser. No. 12/836,290, filed on Jul. 14, 2010, the entire contents of which are incorporated herein by reference.

BACKGROUND

In recent years, mobile stations have become "must have" devices for most people, in many countries. The communications that such devices offer, via wireless mobile communications network, enable users to talk and exchange various types of messages for business and personal reasons and to access information, all from or while traveling through any location where a network provides service. As the technology has advanced, the size of mobile stations has decreased, so that today most can be carried in a pocket or purse, clipped to a belt, etc. There are situations where it is desirable to determine the location of a mobile station, and various industry players have developed technologies to meet such demands. For example, in the US today, most mobile devices are equipped with Global Positioning Satellite (GPS) receivers/processors sufficient to enable emergency services to obtain information as to the location of a device as part of the processing of an emergency call, e.g., to 911. The advanced location capabilities of such mobile stations, however, have also enabled service providers to offer services and applications today that will allow a user of a mobile station to learn their present location and possibly obtain information about that locale and/or related navigation information, via the mobile station itself.

Situations arise where it is desirable for another person to learn the location of a mobile station, and the service providers have developed technologies for many such situations. For example, mobile network service providers today offer at least some types of Mobile Location-Based Service (MLBS) that enable a user of or associated with one mobile station to locate a user of another mobile station, based on the location of the second mobile station. Examples of such services today include Family Locator (formerly Chaperone) offered by Verizon Wireless®, and Boost Loop offered by BoostMobile™.

Family Locator is a simple and secure method for parents to keep a closer tab on their children. The mobile stations are GPS enabled. Family Locator allows a customer (e.g., a parent) to view on a map a location of the Family Locator enabled phone of another customer (e.g., a child) and to receive alerts when the Family Locator enabled phone enters or leaves a particular zone.

Boost Loop expanded this type of location service to include keeping tabs on a wider range of friends and family member. In this connection, Boost Loop is another location-based social service that uses a mobile phone with built-in GPS to automatically update a customer location for a private list of friends. To illustrate, the customer downloads the Boost Loop software onto her mobile phone and publishes its location on a Boost Loop map. Thereafter, the customer may invite other friends who have installed Boost Loop to join the customer's networks. If friends accept such invitation, their locations will also be published on the map. As such, the customer can identify the locations of her friends in real-time on a map display on the customer's mobile station.

Although these mobile station location technologies allow a requesting device, as operated by a user, to monitor or learn the current location of a mobile station that is the "target" of a location information request or procedure, the existing technologies do not allow software applications to make a request for and be giving access to the location of a mobile station for performing software functions based on the location of that mobile station.

Hence, there is still a need for an improved/simplified technique for obtaining information as to the location of a mobile station.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, the present teachings may be practiced without such details. In other instances, well known methods, procedures, components, and/or circuitry have been described at a relatively high-level, without detail, in order to avoid unnecessarily obscuring aspects of the present teachings.

Functionality, systems, and methods for determining the location of a mobile station are shown and described. By use of such, the location of a mobile station can be determined and provided to one or more software applications, such as local weather forecasting and asset tracking applications.

Figure 1:
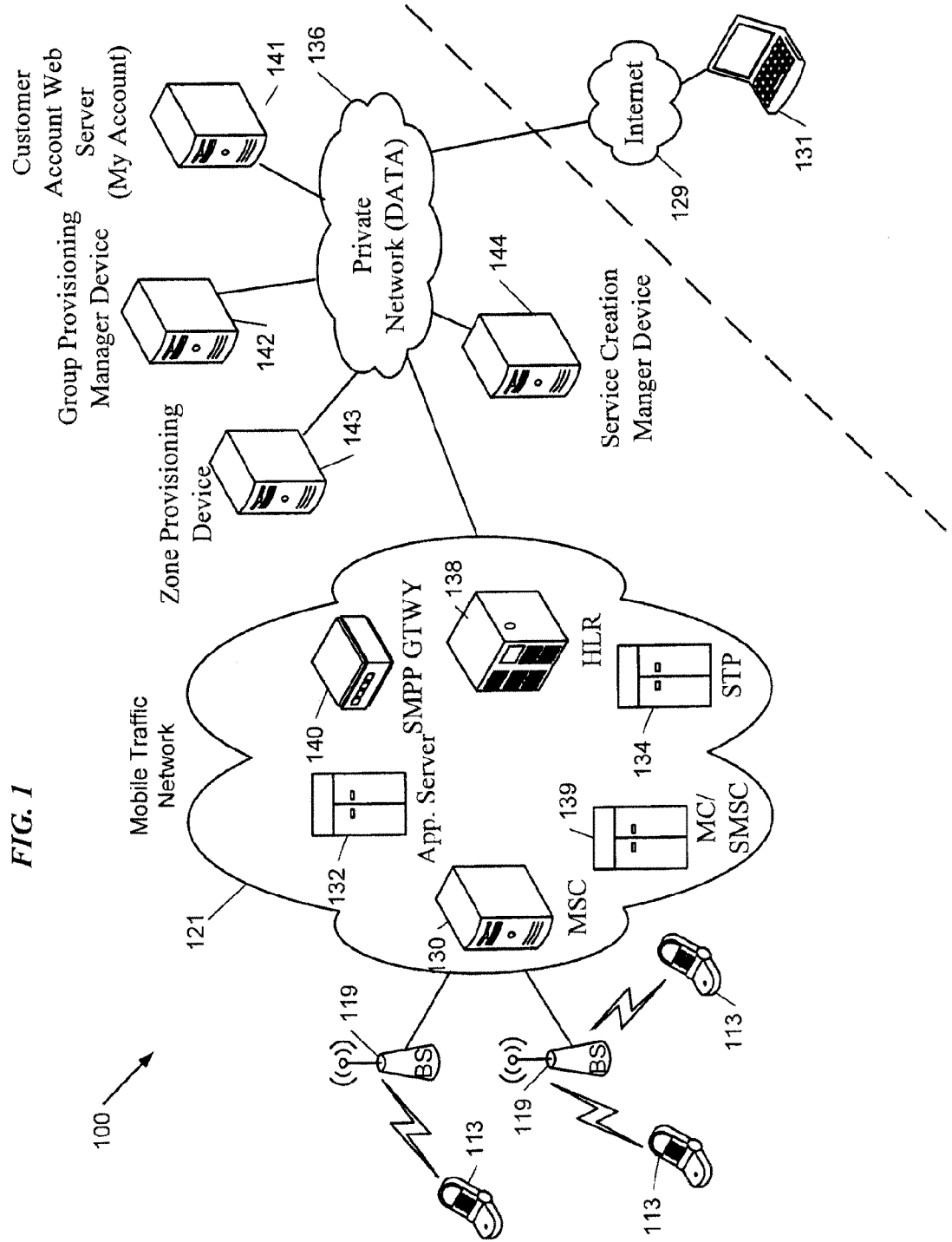
FIG. 1 is a functional block diagram that depicts various components of an exemplary mobile communications network.

Reference now is made in detail to the examples illustrated in the accompanying drawings and discussed below. FIG. 1 illustrates a mobile communication network 100 as may be operated by a carrier or service provider to provide a wide range of mobile communication services and ancillary services or features to its subscriber customers and associated mobile station (MS) users. The elements collectively indicated by the reference numeral 100 generally are elements of the network and are operated by or on behalf of the carrier, although the mobile stations may be sold to and owned by the carrier's customers. The mobile communication network 100 provides communications between mobile stations as well as communications for the mobile stations with networks and stations (not shown) outside the mobile communication network 100.

The wireless mobile communication network 100 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 113 may be capable of conventional voice telephone communications and data communications.

For purposes of later discussion, several mobile stations 113 appear in the drawing, to represent examples of the mobile stations that may receive various services via the mobile communication network 100.

Mobile stations 113 can take the form of portable handsets, smart-phones or personal digital assistants, although they may be implemented in other form factors. Mobile stations 113 can include media content. The media content can be configured to execute on many different types of mobile stations 113. For example, a mobile station application can be written to execute on a binary runtime environment for mobile (BREW-based) mobile station. In further instances, a mobile station application can be written to execute on a Windows Mobile based mobile station, Android, I-Phone, Java Mobile, or RIM based mobile station such as a BlackBerry or the like.

The mobile communication network 100 can be implemented by a number of interconnected networks. Hence, the overall network 100 may include a number of radio access networks (RANs), as well as regional ground networks interconnecting a number of RANs and a wide area network (WAN) interconnecting the regional ground networks to core network elements. A regional portion of the network 100, such as that serving mobile stations 113, can include one or more RANs and a regional circuit and/or packet switched network and associated signaling network facilities.

Physical elements of a RAN operated by one of the mobile service providers or carriers, include a number of base stations represented in the example by the base stations (BSs) 119. Although not separately shown, such a base station 119 can include a base transceiver system (BTS), which can communicate via an antennae system at the site of base station and over the airlink with one or more of the mobile stations 113, when the mobile stations are within range. Each base station can include a BTS coupled to several antennae mounted on a radio tower within a coverage area often referred to as a "cell." The BTS is the part of the radio network that sends and receives RF signals to/from the mobile stations 113 that are served by the base station 119.

The radio access networks can also include a traffic network represented generally by the cloud at 121, which carries the user communications and data for the mobile stations 113 between the base stations 119 and other elements with or through which the mobile stations communicate. In some examples, the mobile traffic network 121 includes network elements that support mobile station media content transfer services such as mobile switching centers (MSCs) 130, signal transfer points (STPs) 134, and an application server (App. Server) 132. The network can also include other elements that support functionality other than media content transfer services such as messaging service messages and voice communications. Examples of other network elements that may be used in support of messaging service message communications include, but are not limited to, message centers (MCs) 139, home location registers (HLRs) 138, simple messaging service point-to-point (SMPP) gateway 140, and other network elements such as wireless internet gateways (WIGs), and visitor location registers (VLRs) (not shown). Other individual elements such as switches and/or routers forming the traffic network 121 are omitted here form simplicity. It will be understood that the various network elements can communicate with each other and other aspects of the mobile communications network 110 and other networks, e.g., the public switched telephone network (PSTN) and the Internet, either directly or indirectly.

The mobile switching center (MSC) 130 is responsible for managing communications between the mobile station and the other elements of the network 110. In addition, the MSC 130 is responsible for handling voice calls and messaging service message requests as well as other services (such as conference calls, FAX and circuit switched data, messaging service communications, Internet access, etc.). The MSC 130 sets up and releases the end-to-end connection or session, and handles mobility and hand-over requirements during the call. The MSC 130 also routes messaging service messages to/from the mobile stations 13, typically from/to an appropriate MC 139. The MSC 130 is sometimes referred to as a "switch". The MSC 130 manages the cell sites, the voice trunks, voicemail, and SS7 links.

The message center (MC) 139, in some examples, allows messaging service messages to be exchanged between mobile telephones and other networks. For SMS messaging, for example, the MC 139 receives packet communications containing text messages from originating mobile stations and forwards the messages via the signaling resources and the signaling channels to the appropriate destination mobile stations. The MC 139 may receive messages from external devices for similar delivery to mobile stations, and the MC 139 may receive similar messages from the mobile devices and forward them to servers or terminal devices, in either case, via an Internet Protocol (IP) packet data network.

In some examples, the MC 139 can also be considered or include functionality that may be considered that of a Short Messaging Service Message Center (SMSC) or a Message Register (MR). Wireless carriers developed the short message service (SMS) to transmit text messages for display on the mobile stations. In many existing network architectures, the SMS traffic uses the signaling portion of the network 121 to carry message traffic between a Short Message Service Center (SMSC) 139 and the mobile stations. The SMSC 139 supports mobile station to mobile station delivery of text messages. However, the SMSC 139 also supports communication of messages between the mobile stations and devices coupled to other networks. For example, the SMSC 139 may receive incoming IP message packets from the Internet 129 for delivery via the network 121, one of the base stations 119 and a signaling channel over the air link to a destination mobile station. For this later type of SMS related communications, the network 110 also includes one or more Short Message Peer-to-Peer (SMPP) protocol gateways 140.

In other examples, the MC 139 can include functionality related to the Enhanced Messaging Service (EMS) or Multimedia Messaging service (MMS). An EMS message can have special text formatting (e.g., such as bold or italic), animations, pictures, icons, sound effects and special ring tones. MMS messages support the sending and receiving of multimedia messages (e.g., images, audio, video and their combinations) to (or from) MMS-enabled mobile stations. In some examples, the MC 139 can be considered in whole or in part a multimedia messaging service center (MMSC).

Although a single MC 139 is shown, a network 10 can have many geographically dispersed MCs 139. The MCs 139 can include destination routing tables (DRTs). In essence the DRTs are databases within the MCs 139. A DRT contains a list of the MDNs which are associated with the various MCs 139. For example, a first MDN is associated with a MC 139 in California while a second MDN is associated with a MC 139 in Virginia. The DRTs are used to determine which MC 139 should attempt to deliver an incoming messaging service message to the destination MDN. For example, if a user associated with the MC in California sends an SMS to a user associated with the MC 39 in Virginia, the California MC 139 sends the SMS to the Virginia MC 133 for delivery to the destination MDN. The communication among the MCs 139 occurs using know protocols such SMPP and the like.

The HLR 138, in some examples, stores a subscriber profile for each of the wireless subscribers and their associated mobile stations 113, 115, and 117. The HLR 138 may reside in an MSC 130 or in a centralized service control point that communicates with the MSC(s) 130 via an out-of-band signaling system such as an SS7 network. The HLR 138 stores for each mobile subscriber the subscriber's mobile directory number (MDN), the mobile identification number (MIN). and information specifying the wireless services subscribed to by the mobile subscriber, such as numeric paging or text-based paging, data communication services, etc. Of course, the HLR 138 can also be a stand-alone device. The HLR also tracks the current point of attachment of the mobile station to the network, e.g., the identification of the MSC 130 with which the mobile station is currently registered to receive service.

The visitor location register (VLR) (not shown) is, in some examples, a temporary database of the mobile stations that have roamed into the particular area which it serves. The VLRs for a region often are implemented in or in association with a MSC 130. Each base station 119 in the network is served by a single VLR, hence a subscriber cannot be present in more than one VLR at a time. The data stored in the VLR has either been received from the HLR 138, or collected from the mobile station.

The SMPP gateway 140 provides functionality to transport messaging service messages to other mobile communication networks and also receive messaging service messages from other networks. The SMPP gateway 140 supports communications using the SMPP protocol. SMPP gateways 140 are Short Message Peer-to-Peer (SMPP) gateways 140 used to connect the wireless communication network (such as an Internal Protocol IP network on the left of the SMPP Gateway 140 in FIG. 1) to another network (such as a public Internet network on the right of the SMPP Gateway 140 in FIG. 1). The SMPP Gateway 140 allows the MC 139 to receive and send messages in IP packet format. The SMPP Gateway 140 is an entity within the wireless network 100 that acts as an intermediary between the wireless service provider network and other networks. For example, the SMPP Gateway 140 converts messages in protocol(s) used by other applications and devices, e.g. Extensible Markup Language (XML), Hypertext Mail Protocol (HTMP), etc., to and from the SMPP protocol. The SMPP messages ride on IP transport, e.g., between the SMPP Gateway 140 and the MC 139.

In addition, the traffic network portion 121 of the mobile communications network 110 connects to a private data network 136. The private data network 136 connects to the traffic network portion 121 via a gateway (not shown). The gateway can provide protocol conversions between the protocols used by the traffic network 121 and the protocols used by the private data network 136.

The private data network 136 can be in communication with various auxiliary services servers, e.g., such as those providing additional services to the users of the network 100, and/or to operations support personnel of the service provider or carrier that operates the network 100. For example, the carrier can also offer its subscribers on-line access to a variety of functions related to the subscribers' accounts, such as review of billing statements and usage data, on-line payment, subscription changes, password control or the like. For that purpose, the carrier can operate a customer account web server 141, offering a "MyAccount" type subscriber interface via the Internet, e.g., a "My Verizon" page for a user having a Verizon Wireless account. Hence, a user's terminal, such as PC 131, may be used to access on-line information about a subscriber's account, which the mobile carrier makes available via the carrier's MyAccount web site accessible through the Internet 129.

In addition, a group provisioning manager device (GPMD) 142, a zone provisioning device (ZPD) 143, and a service creation manager device (SCMD) 144 can be provided in communication with the private data network 136 media content transfer functions, e.g., downloading of media content. The GPMD 142 can also be referred to as a group provisioning manager network device. For discussion purposes, each of the GPMD 142, ZPD 143, and SCMD 144 can be a stand alone computing device such as a server. The functionality described below with respect to each of the GPMD 142, ZPD 143, and SCMD 144 can, however, be provided by one or multiple different computing devices. In other words, the GPMD 142, ZPD 143, and SCMD 144 need not be a standalone computing device in various configurations. The SCMD 144 can maintains provisioning information for a particular end user and mobile station 113. As explained in further detail below for FIG. 2, a network can be provided with various elements for determining the location of a mobile and allowing software applications to make use of such position information.

Figure 2:
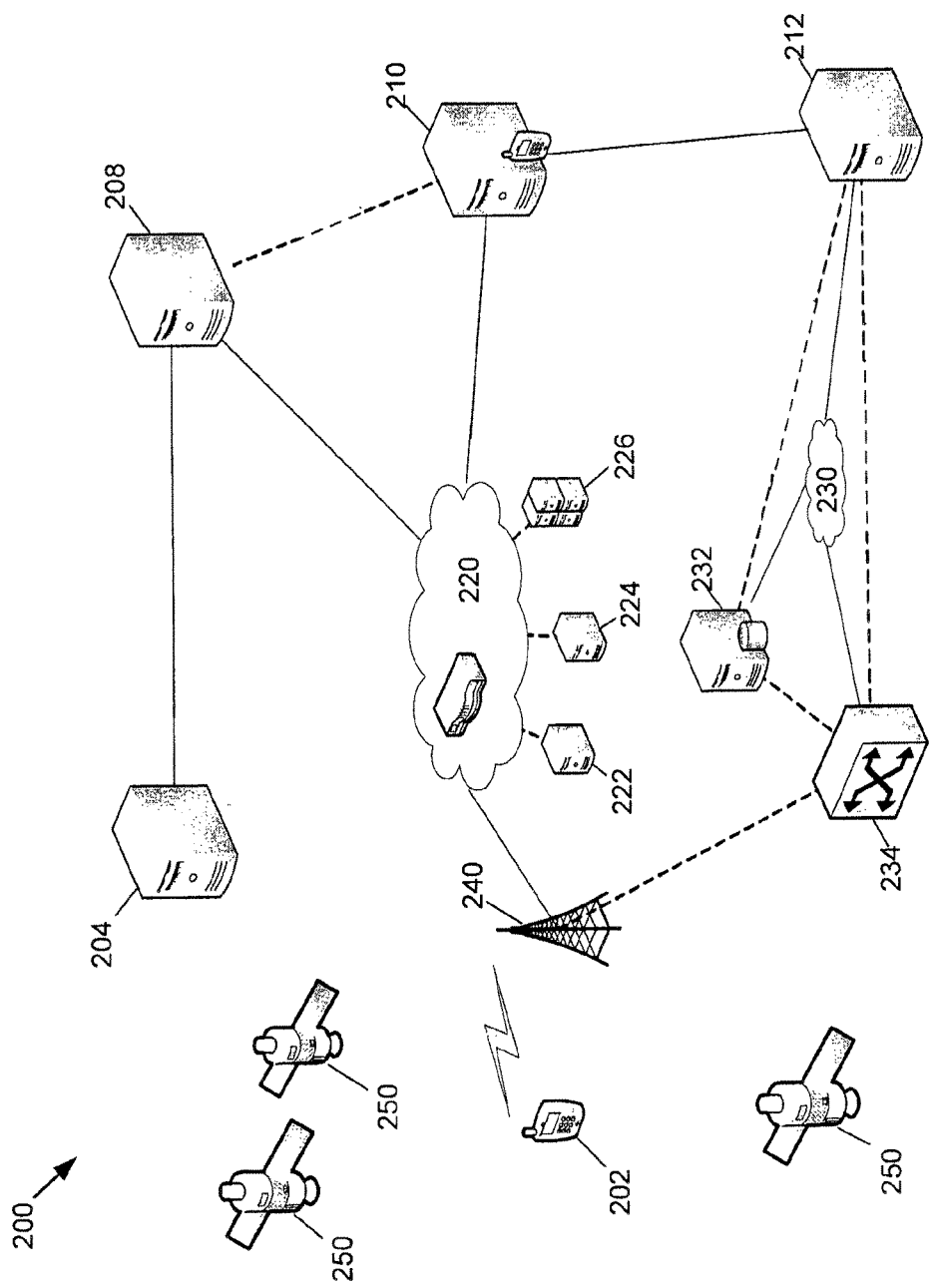
FIG. 2 is a functional block diagram that depicts various components of an exemplary mobile communications network as used for mobile station position determination.

An example of a wireless network with location based services infrastructure (LBSI) for support of granular and coarse location via a network-initiated request is shown FIG. 2. Network 200 includes elements similar to those of network 100 of FIG. 1, including one or more mobile stations 202. The mobile device or station 202 can be an advanced device, e.g., a Blackberry/RIM, Android, Palm, LiMo, Java, or Linux device. API gateway (API GW) 208 functions to allow software applications, e.g., third-party applications (shown by application server 204), to send requests to locate mobile handsets. Such software applications can be resident on the mobile station 202 itself or resident on another platform. Examples of such software applications include but are not limited to weather forecasting/reporting applications and asset or person tracking and/or location applications. The API GW 208 is interfaced with a location gateway (LGW) 210 for supporting location requests from the software application(s) 204. The API GW 208 and LGW 210 are connected to a wireless data network (WDN) 220 of the network 200, which can include SMPP Gateway (GW) 224, AAA server/cache 226, and position determining entity (PDE) 222. The LGW 210 is also connected to a mobile position center (MPC), which is connected to one or more mobile switching centers (MSCs) and home location registers (HLRs) of the wireless network 200. After verifying that the requesting software application (indicated by 204) is authorized to receive the position information for the mobile station 202, the request can be processed and the position information can be determined at different resolutions, or accuracies, based on the request itself and/or network conditions. One position resolution of location, or position accuracy, is "coarse," which is cell ID-based position of a mobile using the latitude/longitude of the centroid of a cell in which the mobile station is operating. Another resolution, or accuracy, is "granular," which can offer a more precise location of the mobile station, e.g., based on GPS determined latitude and longitude of the mobile station. Assisted GPS, Advanced Forward Link Triangulation (AFLT), or other suitable techniques can be used for facilitating granular position determination, as is described in further detail below.

As an overview of a process by which a third party application is provided with the location of a mobile station 202 by way of the LBSI (API GW 208, LGW 210, and MPC 212), the API GW 208 of FIG. 2 provides the single point of interface to third party applications, shown by 204. The API GW 208 receives requests for location from third party applications 204, translates them into mobile location protocol (MLP) commands toward the LGW 210, receives responses from the LGW 210 and responds to third party applications 204 with the location of the mobile station 202. The LGW 210 provides an interface to the API GW 208 to extract device positions in a user plane positioning environment. The LGW 210 can be connected to the WDN 220 via, e.g., two dedicated T1 connections. MPC 212 is provided for coarse location determination and interfaces with the LGW 210 for determining the status of the mobile station 202 (e.g., available or unavailable), identifying the network location of the mobile station (i.e., by way of he Serving Mobile Switching Center 234) and determining the coarse location of the mobile station 202. The MPC is preferably provisioned with the following data: MDN range to HLR address mapping data; MSC identifiers to lat/long mapping data; cell ID to lat/long mapping data; and, MSC Point Code/SSN to MSCID data. In FIG. 2, physical connectivity between network elements is indicated by solid lines while logical interfaces are indicated by dashed lines, suitable examples of which are described below.

As for interfaces between the location-specific network elements of network 200, the interface between the API GW 208 and LGW 210 can be based on OMA Mobile Location Protocol (MLP) v. 3.2 over HTTP. The API GW 208 can be connected to the WDN 220, so existing WDN connectivity to the LGW 210 can be utilized for this interface. This interface can be and preferably is secured using SSL. The interface between the MPC 212 and LGW 210 can be based on Open Mobile Alliance (OMA) Mobile Location Protocol (MLP) v. 3.2. The MPC 212 can interface with the home location registers (HLRs) using, e.g., TIA-41-D, and the MSCs 234, which can include visitor location registers (VLRs), using, e.g., TIA/EIA/IS-881 links, respectively. The API GW 208 itself can interface with the software application(s) via Parlay-X 2.1 Web Services API.

PDEs 222 have resulted from the mobile telecom industry developing a number of technologies to locate mobile stations, both for emergency services (e.g., 911) and for location based applications. In an increasingly common network implementation, the mobile station has the capability to take GPS signal measurements and communicate those measurements to one or more network elements or software applications 204 for processing, depending on the particular application. Typically, a PDE communicates with an appropriately equipped mobile station (MS) to determine the location of the MS, and for non-emergency services, a Location gateway (LGW) makes that information accessible to various user applications, including some applications that reside on mobile stations. Hence, the location determination software in the mobile station 202 enables that station to obtain the location information by working with elements of a location based service (LBS) platform of the mobile wireless communication network, such as a location gateway (LGW) 210 and a PDE 222.

The PDE 222 is a network element that manages the position or geographic location determination of each mobile station. For discussion purposes at this point, it can be assumed that exemplary network 200 utilizes an assisted GPS (AGPS) approach to the determination of mobile station location, in which the mobile station 202 takes measurements of signals from a number of GPS satellites 250 (only three of which are shown, for convenience) and interacts with the PDE 222 to process those measurements so as to determine the latitude and longitude (and possibly altitude) of the current location of the mobile station 202. The PDE system 222 is essentially a general purpose programmable device with an interface for data communication via the network 200 running server software and running programming for implementation of the PDE functions. The PDE 222 stores (e.g., in cache memory) or has access to a complete and up to date set of the satellite data for the constellation of GPS satellites 250 needed to allow computation of position based on pseudorange measurements from satellite signals. The data may include that associated with the entire constellation but will at least include the data for the satellites expected to be broadcasting into the geographic region serviced by the network 200.

When a mobile station such as 202 attempts a GPS position fix, the mobile station provides information allowing the PDE 222 to perform a pre-fix. Typically, the mobile station will provide data identifying the base station 240 through which it is receiving service (and possibly the serving sector). In some implementations, the PDE 222 may receive data regarding several base stations/sectors and signal strengths thereof, for trilateration. The PDE 222 uses information about base station location(s) to process the data received from the mobile station so as to determine a region (e.g., area of the cell or sector, or a general area triangulated based on signals from several base stations) that the mobile station is likely located within. The PDE 222 then uses the pre-fix location to parse the satellite data down, to assistance data that the mobile station at the particular location needs in order to take GPS readings. The PDE 222 sends the parsed satellite data to the mobile station, e.g., to target mobile station 202, for use in taking measurements of signals from appropriate satellites 250. The GPS assistance data may contain selected satellite almanac, satellite visibility, Doppler and clock correction information.

The mobile station 202, in turn, uses this information (also known as acquisition assistance records) to take multiple satellite pseudorange measurements. Depending on the device/network configuration, the mobile station such as 202 or the PDE 222 can then calculate a final fix using these pseudorange measurements. The final fix computation provides latitude and longitude (and possibly altitude) coordinates for the current location of the mobile station 202. If the mobile station 202 has full GPS computation capability, the station 202 would know its current latitude and longitude and would communicate that data to the PDE 222 through the network 200. In many cases, however, the mobile station has only measurement capability, and the mobile station forwards the measurement data to the PDE 222 to determine the final fix. In either case, the GPS processing leads to a situation in which the PDE 222 knows the latitude and longitude of the mobile station, that is to say 202 in the given example. If necessary, the PDE 222 can provide coordinates to the mobile station 202.

For many location based applications today, further processing or access is needed. To provide access to general users, e.g., mobile subscribers and authorized third party users, the carrier also operates a location gateway (LGW) 210. The LGW 210 is essentially a general purpose programmable device with an interface for data communication via the network 200 running server software and running programming for implementation of the LGW functionality. In the example, the server platform runs a queue manager for managing communications and access to the various LGW program modules. The LGW program modules can include a thin API proxy client, for client-server proxy communications with the mobile stations, such as the target mobile station 202. The LGW program modules can also include a PDE adapter, for communications through the network with the PDE 222, e.g., for situations in which the LGW 210 needs to obtain mobile station position data from the PDE 222.

Continuing with the description of network 200, upon receipt of a location request from a third-party application, the API GW 208 sends a request for location to the LGW 210. The LGW 210 makes a determination if coarse or granular location is needed. If granular location is required, the LGW 210 uses user plane location technology. For supporting granular location, a Location Agent (LA) client can be installed on the mobile handset 202. If coarse location is requested, the LGW 210 sends a request to the Control Plane Mobile Position Center (MPC) 212. As indicated, the MPC 212 can interface with a pre-existing SS7 230 network for communicating with HLRs and MSCs.

The LGW 210 determines whether granular or coarse location is required by examining the requested horizontal accuracy of the location request. If the requested horizontal accuracy is less than a specified threshold, e.g., 500 meters, 1000 meters, 1,500 meters, granular location may be attempted. Of course, the specified threshold can be selected as desired, and may be based on operational parameters of the wireless network and/or the GPS system. If the requested horizontal accuracy is equal to or more than a specified threshold, e.g., 1000 meters or 1,500 meters, coarse location may be attempted. In various examples described below, the following location capabilities can be available for supporting network-initiated location requests: single-shot location (granular location with automatic fallback to coarse location, or coarse location); and triggered location, including (i) geographic notification (or "geofencing"); (ii) scheduled notification (granular location with automatic fallback to coarse location, or coarse location). Additionally, the subscriber's location privacy can be managed by an API GW-resident Privacy Engine (PE), which can validate all location requests from third-party applications against the subscriber's privacy profile.

Figure 3:
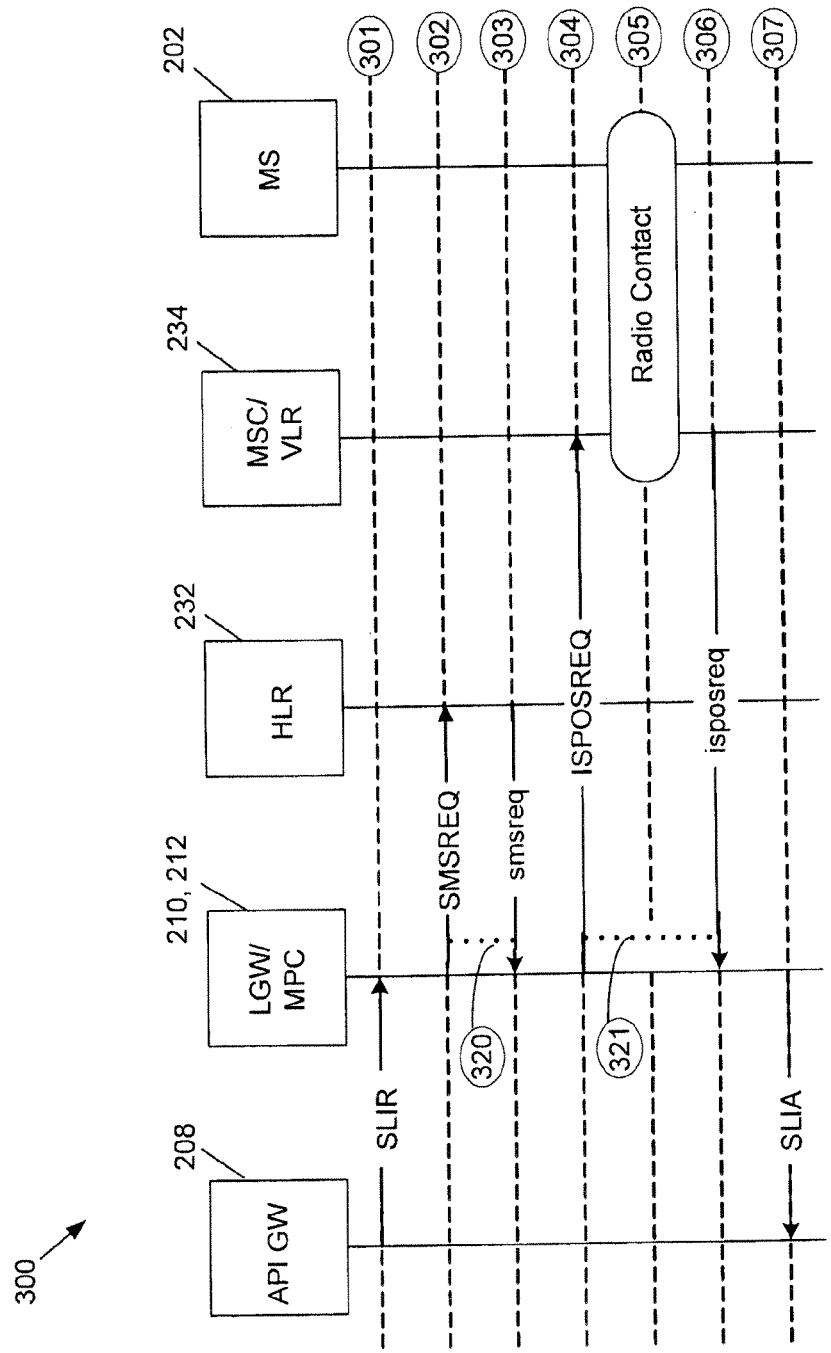
FIG. 3 is a flowchart showing various aspects of a call flow for a coarse location request as utilized for mobile station position determination.

An example of the call flow for coarse location request scenario 300 is shown in FIG. 3, with reference to network elements of network 200 shown and described for FIG. 2. The scenario shown is for when the mobile station 202 in question is within network and idle. Upon receipt of a request for location from a third-party application, the API GW 208 sends a Standard Location Immediate Request (SLIR) command to the LGW 210, as shown at step 301. The MLP message posted to the LGW, and as referenced elsewhere herein, can be written in suitable HTTP script. The SLIR message identifies the third-party application. The LGW/MPC 210/212 pair stores the third-party application ID.

LGW/MPC 210/212 determines that cached location information for this mobile does not meet the criteria specified in the request in step 301, and sends an SMSREQ message to the home location registry (HLR) 232 associated with the identified mobile, as shown at step 302.

A SMSREQ or an LPREQ message can be used for SMSC-to-HLR queries for short messaging applications. In the scenario depicted in FIG. 3, the MPC 212 uses the SMSREQ message to query the HLR 232 for the MSC 234 that is currently serving the targeted mobile station 202.

The HLR 232 can respond with a smsreq message, as shown at step 303, providing the SS7 network address of the MSC 234 serving the targeted mobile station 202.

Following step 303, the MPC 212 sends an ISPOSREQ to the MSC 234 serving the mobile 202, as shown at step 304. Coarse location is not necessarily supported when the target mobile 202 is outside the (e.g., VzW) network. The MPC 212 can make this determination by comparing the SS7 network address of the serving MSC 234 returned by the HLR 232 against provided SS7 network addresses of all MSCs provisioned on the MPC. If the serving MSC address provided by the HLR 232 is not in the MPC records, the MPC 212 can conclude that the handset or mobile station 202 is outside the network, and can return an error code, e.g., 500 "MS Roamed Out" via the LGW 210 to the API GW 208.

The serving MSC 234 establishes radio contact with the MS 202 (e.g., pages the MS) to obtain the current serving cell information, as shown at step 305. The serving MSC 234 can then send an isposreq message to the MPC 212 including the serving cell ID and MSC ID information as shown at step 306.

If the serving MSC 234 is a Wireless SoftSwitch (WSS), it can additionally return POSINFO parameter containing the location (latitude/longitude) of the, e.g., Femto cell (a.k.a. Network Extender) in the isposreq message.

Continuing with the description of the example, the MPC 212 will look up the cell centroid latitude/longitude for the serving cell ID received in isposreq. To facilitate such, the network provider or third parties can prepare and supply Base Station Almanac (BSA) data for provisioning on the MPC 212. If the isposreq includes the POSINFO parameter, the MPC 212 can use the latitude/longitude information provided in the POSINFO parameter instead. The LGW 210 returns a Standard Location Immediate Answer (SLIA) message to the API GW 208, as shown at step 307. The pos_method attribute can be returned in the SLIA message. Communication between the MPC 212 and HLR 232 is indicated at 320 while communication between the MPC and the MSC/VLR 234 is indicated at 321.

Figure 4:
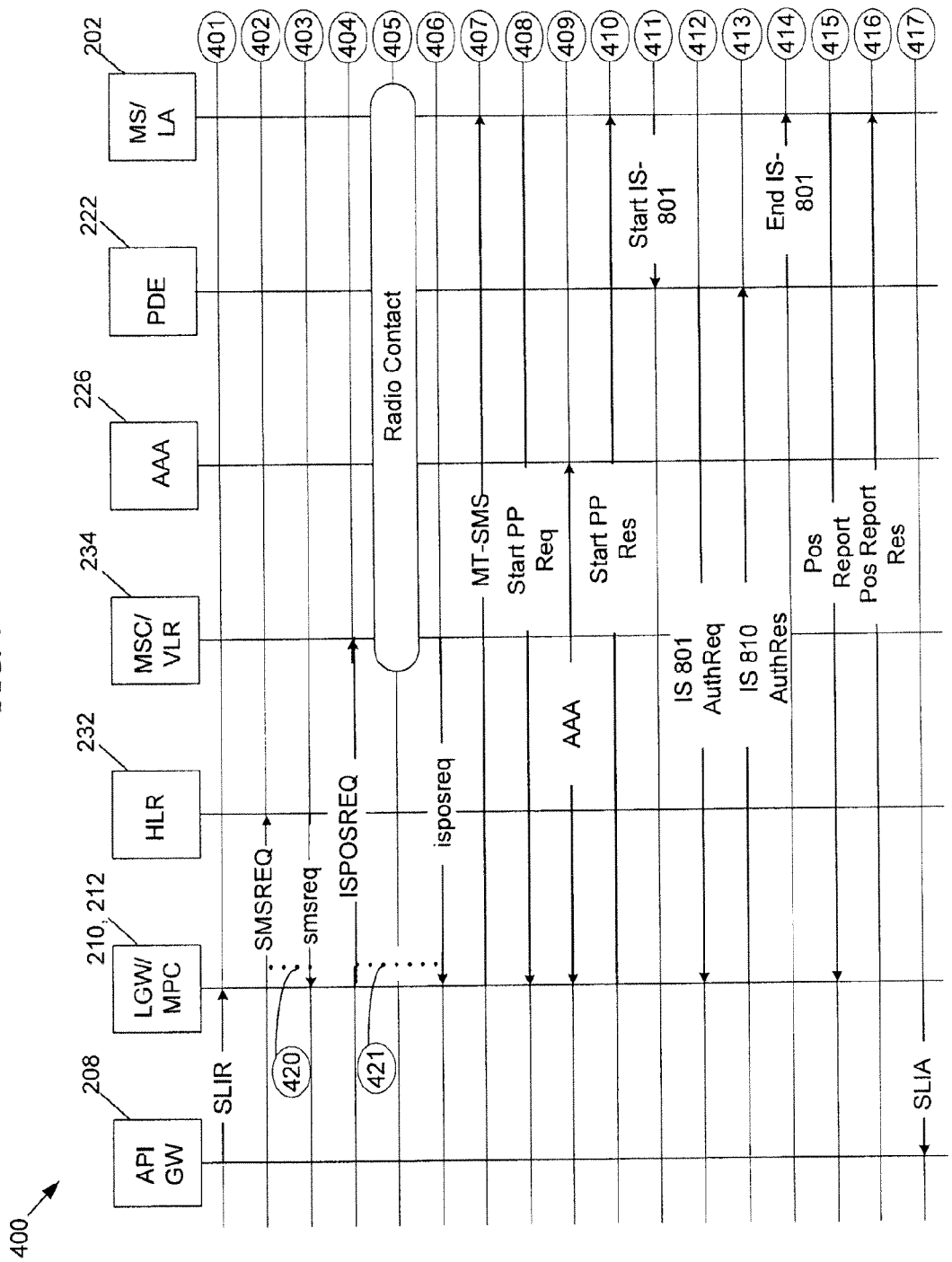
FIG. 4 is a flowchart showing various further aspects of a call flow for a granular location request as utilized for mobile station position determination.

An example of the call flow for granular location request scenario 400 is shown in FIG. 4, with reference to network elements of network 200 shown and described for FIG. 2. Step 401 is the same as step 301 in FIG. 3 with the caveat the requested accuracy in this scenario is 100 m. Steps 402-406 are the same as steps 302-306 in FIG. 3. Steps 402-406 are executed to support fallback to coarse location in the event that granular location (position determination) is unavailable.

Continuing with the description of FIG. 4, at step 407, the LGW 210 now has the status of the mobile 202 (available) and has the coarse location of the mobile 202. The LGW 210 will provide the coarse location if granular location cannot be determined for any reason. The LGW 210 sends a mobile-terminated (MT) SMS message to the Location Agent in the mobile handset 202. If the name of the third-party application is provided in step 401, the LGW 210 will include it in the MT SMS message to allow the Location Agent to display it on the mobile handset 202. The Location Agent sends a StartPositionProcessRequest message to the LGW via HTTPS, as described at step 408.

At step 409, the LGW 210 checks in the AAA cache (indicated by 226) for availability of MIN, IP pair in cache. If cache is not available, a request is made to an AAA server (also indicated by 226) to authenticate client. The response can be cached at the LGW 210 with SPPRequest. As part of this authentication process, the IP, MDN, MIN and carrier ID for the device 202 are extracted from the AAA server. The LGW 210 can consider a request as authorized if the IP, MDN, MIN from AAA server match the IP, MIN, and MDN as part of the SPPRequest, and if the carrier ID returned by the AAA server for the device is of a supported/authorized carrier. If "null" is returned as a carrier ID or if no value is returned for carrier ID by the AAA server, the request is considered as authorized.

At step 410, the LGW 210 returns an SPPResponse to the handset 202 containing IP address of the PDE. At step 411, upon receipt of the PDE IP addresses in the SPPResponse message, the Location Agent invokes the native IPOSDET_GetGPSInfo( ) function. The mobile device or station 202 can be an advanced device, e.g., a Blackberry/RIM, Android, Palm, LiMo, Java, or Linux device. For example, if the mobile station 202 is a BREW device, the BREW OS connects to the PDE 222 (on IS-801 Authenticator port) to begin the IS-801 session. At step 412, the PDE 222 calls the LGW 210 to do (IP, MIN) authentication (IS-801 Auth Req) to make sure the requester is a valid handset, a corresponding SPPRequest exist and if the device is on an authorized network (if roaming). At step 413, the LGW 210 validates that an SPPRequest exist corresponding to this request. IS-801 Authentication result (IS-801 Auth Resp) is sent to the PDE asynchronously.

As shown a step 414, the PDE 222 completes the IS-801 session. After the IS-801 session is competed successfully, the MS 202 has the current location information. At step 415, the Location Agent (LA) sends the updated location to the LGW 210 in a Position Report message. At step 416, the LGW 210 updates its local cache with position from position report and sends a response to the Location Agent (LA). This position information can be made available for any future location requests. The call flow 400 ends at step 417, where the LGW 210 returns a Standard Location Immediate Answer (SLIA) message to the API GW 208, as shown at step 307. The pos_method attribute can be returned in the SLIA message for use by the API GW 208 in providing the requested mobile station location to the software 204. Communication between the MPC 212 and HLR 232 is indicated at 420 while communication between the MPC and the MSCNLR 234 is indicted at 421.

Figure 5:
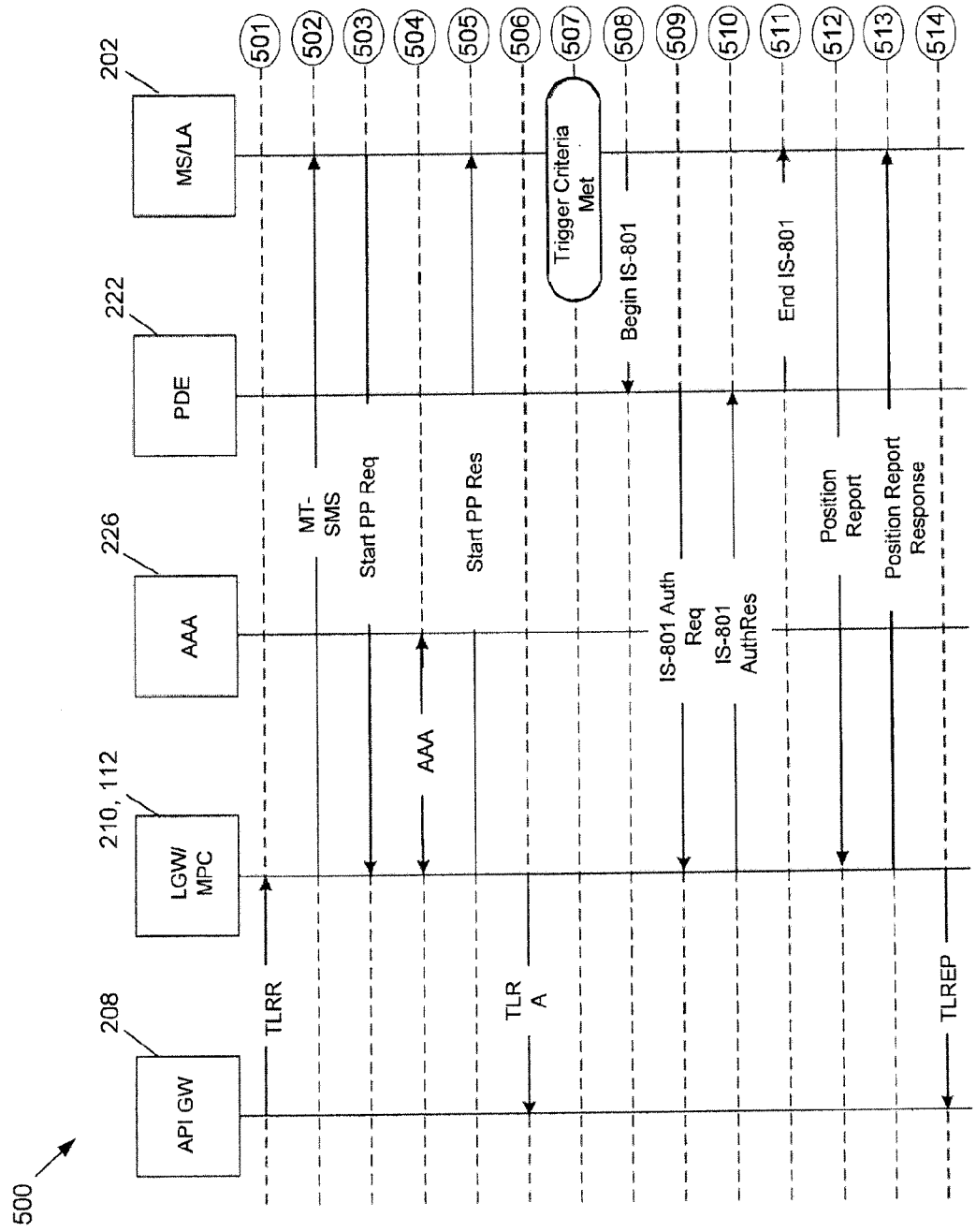
FIG. 5 is a flowchart showing various further aspects of a call flow for geographic notification as utilized for mobile station position determination.

An example of the call flow for geographic notification scenario 500 is shown in FIG. 5, with reference to network elements of network 200 shown and described for FIG. 2. At step 501, the API GW 208 sends a Triggered Location Reporting Request (TLRR) command to the LGW 210. Steps 502-505 are the same as steps 407-410 of FIG. 4. At step 506, the LGW 210 sends a Triggered Location Reporting Answer (TLRA) message to the API GW 208. At step 507, the geographic notification criteria is indicated as being met on the LA resident on the mobile station 202. Steps 508-513 are the same as steps 411-416 of FIG. 4. These steps are executed by the Location Agent/Handset 202 when the trigger criteria for the requested geographic notification is met. As shown as step 514, the LGW 210 returns a TLREP message to the API GW 208.

Figure 6:
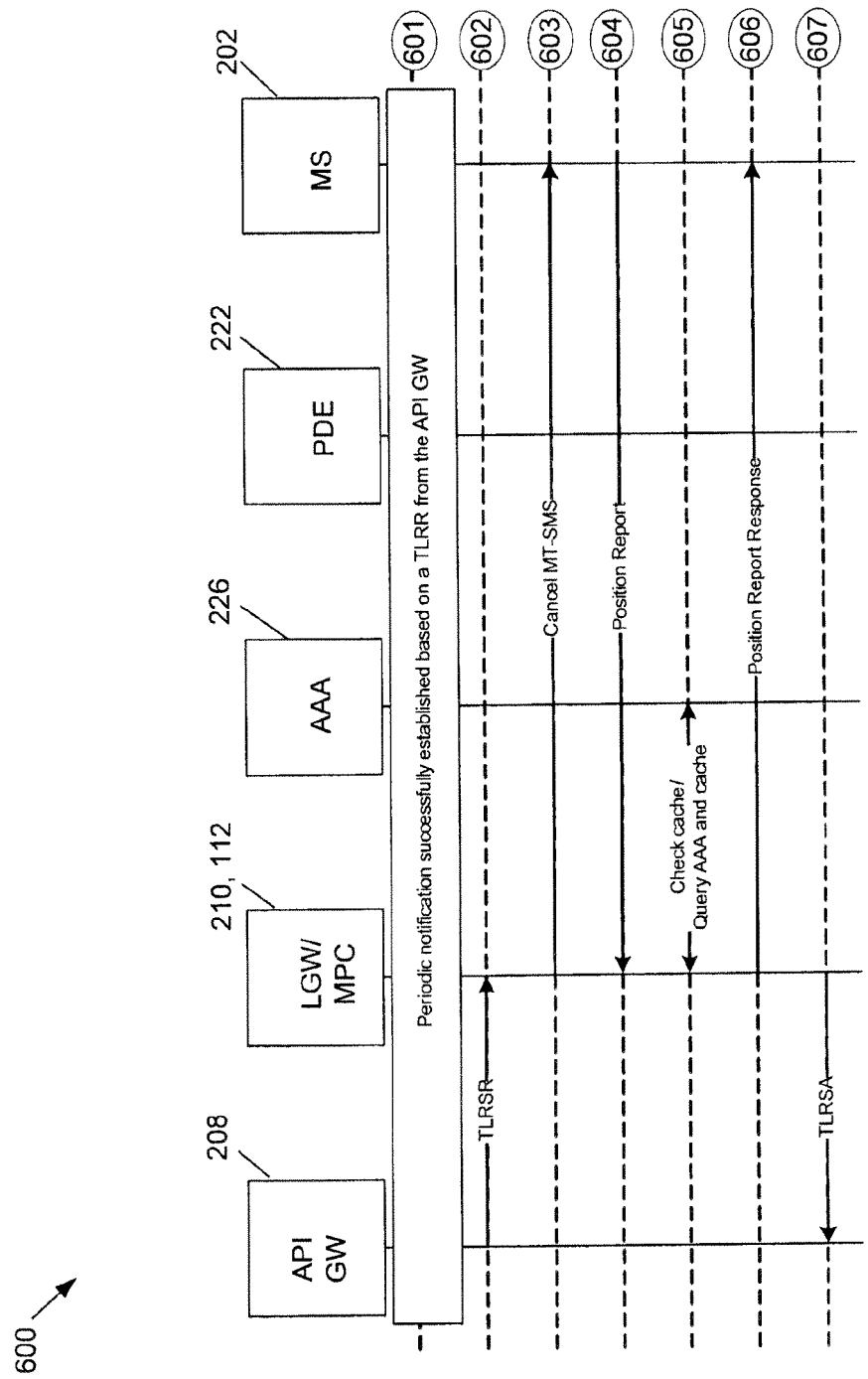
FIG. 6 is a flowchart showing various further aspects of a call flow for cancellation of geographic notification as utilized for mobile station position determination.

An example of the call flow for cancellation of geographic notification scenario 600 is shown in FIG. 6, with reference to network elements of network 200 shown and described for FIG. 2. At step 601, a periodic notification is successfully established using the triggered location reporting call flow in FIG. 5. At step 602, the API GW 208 sends a TLRSR message to the LGW 210. At step 603, the LGW 210 sends a Cancel periodic notification SMS trigger message to Location Agent/MS 202. At step 604, the Location Agent/MS 202 sends a PositionReport message to the LGW 210. The ReportReason parameter is set to PositionReportCancelConfirmation (00000110), and the Status Indicator parameter is set to Success (00000000). At step 605, the LGW 210 does an IP, MIN check to validate that the sender of the PositionReport message is a valid subscriber. At step 606, the LGW 210 sends a PositionReportResponse message to the MS 202. Finally, as indicated at step 607, the LGW returns TLRSA response to the API GW.

Figure 7:
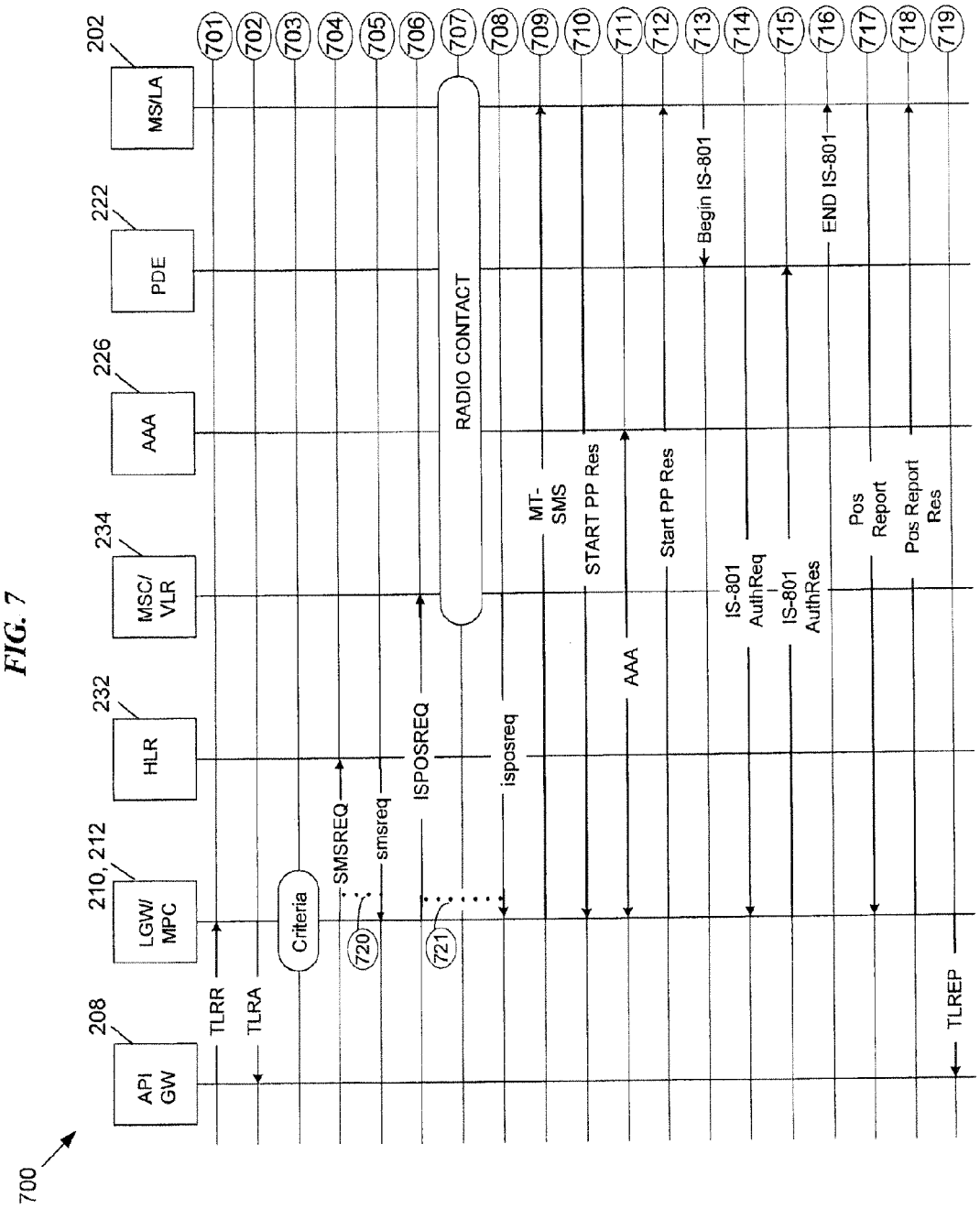
FIG. 7 is a flowchart showing various further aspects of a call flow for scheduled notification as utilized for mobile station position determination.

The call flow for a scheduled or triggered notification scenario 700 is shown in FIG. 7, with reference to network elements of network 200 shown and described for FIG. 2. As indicated at step 701, the API GW 208 sends a TLRR command to the LGW 210. As indicated at step 702, the LGW 210 sends a TLRA message in response to acknowledge the TLRR command. At step 703, the scheduled notification criteria is indicated as being met on the LGW. Communication between the MPC 212 and HLR 232 is indicated at 720 while communication between the MPC and the MSC/VLR 234 is indicted at 721. Steps 704-718 are the same as steps 502-514 of FIG. 5. At step 719, the PLS 610 returns a TLRP message to the API GW 208, which in turn provide position information of the mobile station 202 to the requesting application.

Figure 8:
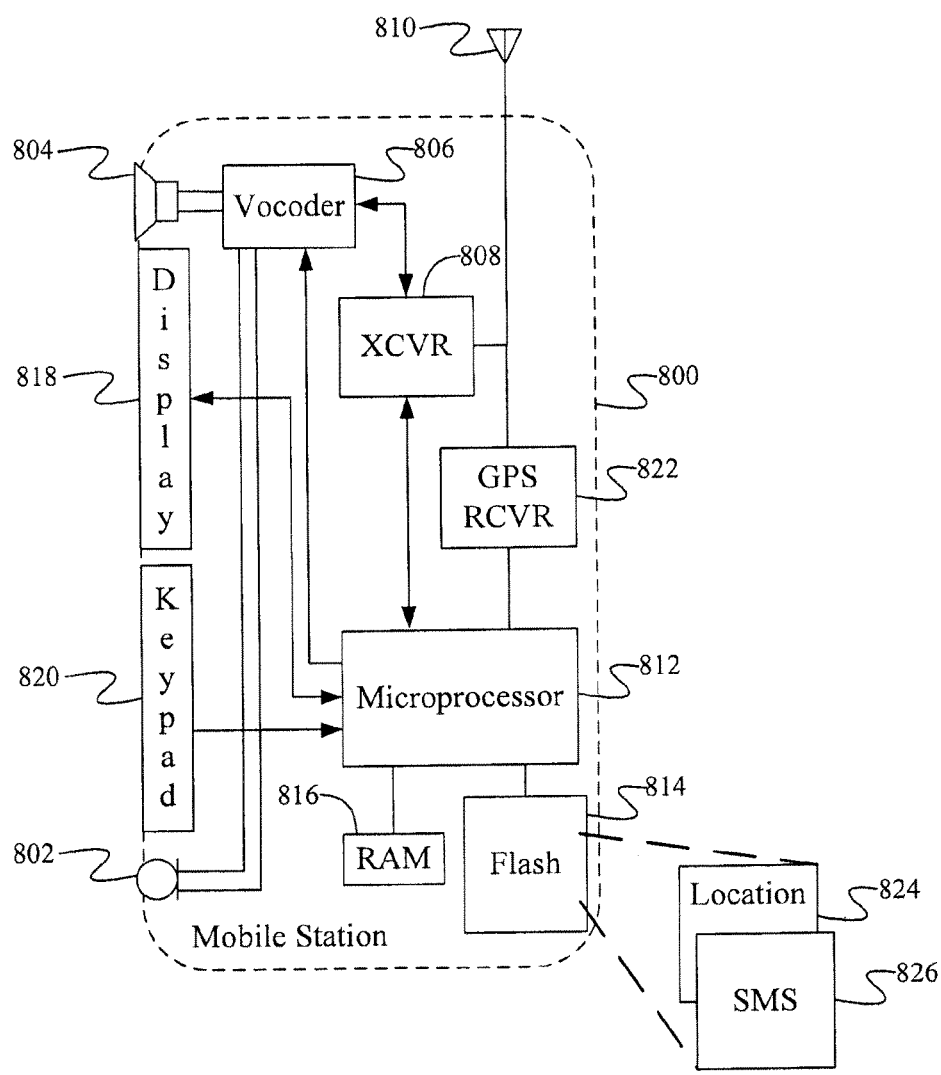
FIG. 8 is a high-level block diagram of an exemplary mobile station device.

For purposes of such a discussion, FIG. 8 provides a block diagram illustration of an exemplary wireless device 800, which may be used as mobile station 102 shown in FIG. 1. Although the wireless device 800 may be a smart-phone or may be incorporated into another device, such as a personal digital assistant (PDA) or the like, for discussion purposes, the illustration shows the wireless device 800 in the form of a handset. The handset embodiment of the wireless device 800 functions as a normal digital wireless telephone station. For that function, the station 800 includes a microphone 802 for audio signal input and a speaker 804 for audio signal output. The microphone 802 and speaker 804 connect to voice coding and decoding circuitry (vocoder) 806. For a voice telephone call, for example, the vocoder 806 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 800 also includes at least one digital transceiver (XCVR) 808. The handset 800 can be configured for digital wireless communications using one or more of the common network technology types. For example, the handset 800 may be a dual mode device capable of utilizing either or both of CDMA (IS-95, 1XRTT or EV-DO) technologies and/or 3GPP (LTE/GSM/UMTS) technologies. For that purpose, the transceiver (XCVR) 808 can be a multimode transceiver, or the handset 800 may include two or more transceivers, each of which supports a subset of the various technologies or modes. The concepts discussed here encompass implementations of the station 800 that can utilize any digital transceivers that conform to current or future developed digital wireless communication standards. The mobile station 800 may also be capable of analog operation via a legacy network technology.

The transceiver 808 functions to provide two-way wireless communication of information, such as vocoded speech samples and/or digital message information, in accordance with the technology of the associated network, e.g., network 100 of FIG. 1. The transceiver 808 also sends and receives a variety of signaling messages in support of the various voice and data services provided via the station 800 and the communication network. Each transceiver 808 connects through RF send and receive amplifiers (not separately shown) to an antenna 810. In the example, the transceiver 808 is configured for RF communication in accord with a digital wireless protocol, such as the current CDMA and 3GPP protocols. Of note for purposes of this discussion, the transceiver also supports mobile messaging service message communications to and from the handset 800. In the example, the transceiver supports at least SMS type messaging although it may also support other mobile messaging such as EMS and/or MMS.

The station 800 includes a display 818 for displaying messages, menus or the like, call related information dialed by the user, calling party numbers, etc. A keypad 820 enables dialing digits for voice and/or data calls as well as generating selection inputs, for example, as may be keyed-in by the user based on a displayed menu or as a cursor control and selection of a highlighted item on a displayed screen. The display 818 and keypad 820 are the physical elements providing a textual or graphical user interface. Various combinations of the keypad 820, display 818, microphone 802 and speaker 804 may be used as the physical input output elements of the graphical user interface (GUI), for multimedia (e.g., audio and/or video) communications. Of course other user interface elements may be used, such as a stylus and touch sensitive display screen, as in a PDA or smart phone.

In addition to normal telephone and data communication related input/output (including message input and message display functions), the user interface elements also may be used for display of menus and other information to the user and user input of selections, including any needed during a device location operation. For example, if used as the requesting mobile station 832, the keypad would be used to input the MDN of the target station 831 as well as the requisite code (activation code and password) and then initiate transmission. Then, based on the response from the mobile station 831, the device 800 would display the current location information on display 818.

A microprocessor 812 serves as a programmable controller for the wireless device 800, in that it controls all operations of the wireless device 800 in accord with programming that it executes, for all normal operations, and for operations involved in the device location procedure under consideration here. In the example, the wireless device 800 includes flash type program memory 814, for storage of various "software" or "firmware" program routines and mobile configuration settings, such as mobile directory number (MDN) and/or mobile identification number (MIN), etc. The wireless device 800 may also include a non-volatile random access memory (RAM) 816 for a working data processing memory. Of course, other storage devices or configurations may be added to or substituted for those in the example. In a present implementation, the flash type program memory 814 stores firmware such as a boot routine, device driver software, an operating system, call processing software and vocoder control software, and any of a wide variety of other applications, such as client browser software and short message service software. The memories 814, 816 also store various data, such as telephone numbers and server addresses, downloaded data such as multimedia content, and various data input by the user. Programming stored in the flash type program memory 814, sometimes referred to as "firmware," is loaded into and executed by the microprocessor 812.

For position determination and associated location based functions, the mobile station 800 can also include a GPS receiver 822. Under control of the microprocessor 812, the GPS receiver 822 receives and processes signals from one or more satellites of the GPS constellation, e.g., represented by satellites 250 in FIG. 2. From its processing, the GPS receiver 822 supplies GPS data to the microprocessor 812, such as pseudorange measurements and associated PN codes for measured satellite signals. Associated computations may be performed in the microprocessor or by a processor or the like included in the GPS receiver.

If the receiver 822 or the combination of the receiver and the microprocessor 812 are configured to provide a fully functional GPS position determination device, the station 800 could process the pseudorange measurements, absolute times of transmission of the GPS signals, and satellite position data to compute at least the station's latitude and longitude and possibly translate that data into location information such as street address. However, because of size/space/cost constraints on the design of the mobile stations, the GPS receiver 822 in the mobile station 800 often will have only reception capability, not the full GPS processing capability to resolve position from signals received from the satellites, e.g., satellites 250 in FIG. 2. Hence, the receiver 822 supplies the GPS measurement and code data to the microprocessor 812, which in turn formats the data and sends it to a PDE, e.g., PDE 222 of FIG. 2, using the wireless transceiver 808. As outlined above, the PDE 822 performs the data processing necessary to determine the latitude and longitude of the station 800 and transmits that data where needed, e.g., for use by LGW 210 in FIG. 2 to provide the street address or the like back to the mobile station 100 for inclusion in the location response message sent at S4.

As outlined above, the mobile station 800 includes a processor, and programming stored in the flash memory 814 configures the processor so that the mobile station is capable of performing various desired functions, including in this case the functions involved in the technique for providing location information.

In the example, the executable programming stored in the flash memory 814 includes at least some minimal location determination software 824. The location determination software 824 in the example can control the checking of the user password; and that programming controls the operation of the GPS receiver 822, the processing of the GPS measurements and the interactions through the network, e.g. with LGW 210 and PDE 222 of FIG. 2, to determine location essentially as discussed above. The executable programming also includes SMS message communication programming 826, for recognizing the activation code to start the program 824 and to receive/send the various SMS messages. Hence, the executable programming 824, 826 configures the microprocessor so that the mobile station 800 is capable of providing the location information, as did the target mobile station 202 in the example of FIG. 2.

The structure and operation of the mobile station 800, as outlined above, were described to by way of example, only.

As shown by the above discussion, functions relating to the automated locating of a mobile station may be implemented on programmable mobile stations configured for wireless communication via a mobile communication network, operating as an one of the mobile stations as shown by way of example in FIGS. 1-2.

The software functionalities involve programming, including executable code as well as associated stored data, e.g., files used for the code recognition. The programming code is executable by the processor (microprocessor or the like) that functions as the control element of the particular mobile station device. In operation, the code is stored within the memory of the mobile station for loading and execution by the processor. At other times, however, the executable code may be stored at other locations and/or transported for loading into the mobile station. Execution of such code by the processor of the mobile station enables the mobile station to implement the methodology for providing location information, in essentially the manner performed in the examples discussed and illustrated herein.

Hence, aspects of the methods of providing location information outlined above may be embodied in programming. Program aspects of the technology may be thought of as "products" or "articles of manufacture" typically in the form of executable code and/or associated data that is carried on or embodied in a type of machine readable medium. "Storage" type media include any or all of the non-transitory, tangible memory of the computers, processors, mobile stations or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from a computer or processor into the mobile station to add or update the functionality to that device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, "storage" media relates to tangible, non-transitory media for storing programming and/or data, and unless restricted to such "storage" media, terms such as computer or machine "readable medium" refer to any medium that participates in providing instructions to a processor for execution.

Such a machine readable medium may take many forms, including but not limited to, a tangible storage medium, a carrier wave medium or physical transmission medium. Non-volatile storage media include, for example, optical or magnetic disks, such as any of the storage devices in the mobile stations illustrated in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a Flash-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

3GPP2: 3rd generation partnership project 2
AAA: authentication-authorization-accounting
ADS: application download server
AGPS: assisted global positioning system
API: application programming interface
BREW: binary runtime environment for wireless
BS: base station
BTS: base transceiver system
CDMA: code division multiple access
CD-ROM: compact disc read-only memory
CLNR: certified like-new replacement
DNDA: do not disturb application
DVD: digital video disc
DVD-ROM: digital versatile (video) disc read-only memory
EPROM: erasable programmable read-only memory
EV-DO: evolution-data optimized
ESN: electronic serial number
GPM: group provisioning manager
GPMD: group provisioning manager device
GPS: Global Positioning System
GSM: global system for mobile communications
GW: gateway
HA: home agent
HLR: home location register
IP: Internet protocol
IR: infrared
LBS: location based services
LBSI: location based services infrastructure
LCD: liquid crystal display
LDAP: lightweight directory access protocol
LTE: long-term evolution
MC: message center
MDN: mobile directory number
MN: mobile identification number
MPC: mobile positioning center
MS: mobile station
MSC: mobile switching center
MT: mobile traffic
PC: personal computer
PDE: position determining entity
PN: pseudo-random noise
PROM: programmable read-only memory\
PSDN: packet data serving node
PSTN: public switched telephone network
RAM: random access memory
RAN: radio access network
RF: radio frequency
SCM: service creation manager SCMD: service creation manager device
SIF: standard interchange format
SMPP: short message peer-to-peer
SMS: short messaging service
SS7: signaling system 7
STP: signaling transfer points
TCP: transmission control protocol
TDMA: time-division multiple access
UMTS: universal mobile telecommunications system
USB: universal serial bus
VLR: visitor location register
WAN: wide are network
XCVR: transceiver
ZPD: zone provisioning device

What is claimed is:

1. A method comprising:
receiving a mobile station location request from a software application, the location request including a request from the software application to receive triggered notifications of a location of a mobile station connected to a wireless mobile communications network;
transmitting a message to the mobile station through the wireless mobile communication network to cause the mobile station to provide mobile station location information upon trigger criteria being met; and
upon the mobile station determining that the trigger criteria are met,
 (a) receiving a request to authenticate the mobile station, the request including at least one identifier for the mobile station;
 (b) in response to authenticating the mobile station using the at least one identifier, receiving a position report message including updated location information indicative of a location of the mobile station upon the trigger criteria being met; and
 (c) sending to the software application a message including the updated location information for the mobile station.

2. The method of claim 1, wherein the authenticating of the mobile station comprises at least one of:
authenticating the mobile station to ensure that the mobile station identified in the request to authenticate is a valid station using at least one of an IP address and a mobile identification number (MIN) for the mobile station; and
confirming that the mobile station, identified in the request to authenticate, corresponds to a mobile station for which a request for location notification was previously received.

3. The method of claim 1, further comprising:
sending a request message to a home location register (HLR) associated with the mobile station to obtain identification of a mobile switching center (MSC) serving the mobile station;
upon receiving a response message from the HLR identifying the MSC serving the mobile station, comparing a network address for the identified MSC to network addresses for MSCs of wireless mobile communication network supporting location determination to determine whether the mobile station is connected to a wireless mobile communications network supporting location determination; and
returning an error message to the mobile station upon determining that the mobile station is not currently connected to a wireless mobile communication network supporting location determination.

4. The method of claim 1, further comprising:
prior to transmitting the message to the mobile station, determining whether the software application is authorized to receive position information for the mobile station based at least in part on a privacy profile for a subscriber associated with the mobile station.

5. The method of claim 1, wherein the trigger criteria associated with the request for triggered notifications of the mobile station location include a trigger based on a geographic location of the mobile station.

6. The method of claim 1, wherein the trigger criteria associated with the request for triggered notifications of the mobile station location include a scheduled trigger or a periodic trigger.

7. The method of claim 1, further comprising:
transmitting to the mobile station an address for a position determining entity (PDE) server,
wherein the request to authenticate the mobile station is received from the PDE, and an authentication response message is sent to the PDE following the authenticating of the mobile station.

8. The method of claim 1, further comprising:
receiving a cancellation request from the software application, the cancellation request corresponding to a request to cancel the triggered notifications of the location of the mobile station;
transmitting a cancellation message to the mobile station through the wireless mobile communication network to cause the mobile station to cancel provision of mobile station location information upon trigger criteria being met;
in response to transmitting the cancellation message, receiving a cancellation confirmation message from the mobile station across the wireless mobile communication; and
authenticating a sender of the received cancellation confirmation message to validate that the sender of the message is the mobile station.

9. A system comprising:
a wireless mobile communications network providing wireless mobile communication services to a plurality of mobile stations;
a location gateway server operative to communicate with the plurality of mobile stations across the wireless mobile communications network, and configured to perform functions including functions to:
 receive a mobile station location request from a software application, the location request including a request from the software application to receive triggered notifications of a location of a mobile station connected to the wireless mobile communications network;
 transmit a message to the mobile station through the wireless mobile communication network to cause the mobile station to provide mobile station location information upon trigger criteria being met; and
 upon the mobile station determining that the trigger criteria are met,
  (a) receive a request to authenticate the mobile station, the request including at least one identifier for the mobile station;
  (b) in response to authenticating the mobile station using the at least one identifier, receive a position report message including updated location information indicative of a location of the mobile station upon the trigger criteria being met; and (c) send to the software application a message including the updated location information for the mobile station.

10. The system of claim 9, wherein the authenticating of the mobile station comprises at least one of:
   authenticating the mobile station to ensure that the mobile station identified in the request to authenticate is a valid station using at least one of an IP address and a mobile identification number (MIN) for the mobile station; and
   confirming that the mobile station, identified in the request to authenticate, corresponds to a mobile station for which a request for location notification was previously received.

11. The system of claim 9, where the location gateway server is further configured to perform functions to:
   send a request message to a home location register (HLR) associated with the mobile station to obtain identification of a mobile switching center (MSC) serving the mobile station;
   upon receiving a response message from the HLR identifying the MSC serving the mobile station, compare a network address for the identified MSC to network addresses for MSCs of wireless mobile communication network supporting location determination to determine whether the mobile station is connected to a wireless mobile communications network supporting location determination; and
   return an error message to the mobile station upon determining that the mobile station is not currently connected to a wireless mobile communication network supporting location determination.

12. The system of claim 9, where the location gateway server is further configured to perform a function to:
   prior to transmitting the message to the mobile station, determine whether the software application is authorized to receive position information for the mobile station based at least in part on a privacy profile for a subscriber associated with the mobile station.

13. The system of claim 9, wherein the trigger criteria associated with the request for triggered notifications of the mobile station location include a trigger based on a geographic location of the mobile station.

14. The system of claim 9, wherein the trigger criteria associated with the request for triggered notifications of the mobile station location include a scheduled trigger or a periodic trigger.

15. The system of claim 9, where the location gateway server is further configured to perform a function to:
   transmit to the mobile station an address for a position determining entity (PDE) server,
   wherein the request to authenticate the mobile station is received from the PDE, and an authentication response message is sent to the PDE following the authenticating of the mobile station.

16. The system of claim 9, where the location gateway server is further configured to perform functions to:
   receive a cancellation request from the software application, the cancellation request corresponding to a request to cancel the triggered notifications of the location of the mobile station;
   transmit a cancellation message to the mobile station through the wireless mobile communication network to cause the mobile station to cancel provision of mobile station location information upon trigger criteria being met;
   in response to transmitting the cancellation message, receive a cancellation confirmation message from the mobile station across the wireless mobile communication; and
   authenticate a sender of the received cancellation confirmation message to validate that the sender of the message is the mobile station.

17. An article of manufacture comprising:
a non-transitory machine readable medium; and
machine-executable instructions embodied in the medium that, if executed by a processor of a location gateway server, cause the location gateway server to perform functions including functions to:
   receive a mobile station location request from a software application, the location request including a request from the software application to receive triggered notifications of a location of a mobile station connected to a wireless mobile communications network;
   transmit a message to the mobile station through the wireless mobile communication network to cause the mobile station to provide mobile station location information upon trigger criteria being met; and
   upon the mobile station determining that the trigger criteria are met,
      (a) receive a request to authenticate the mobile station, the request including at least one identifier for the mobile station;
      (b) in response to authenticating the mobile station using the at least one identifier, receive a position report message including updated location information indicative of a location of the mobile station upon the trigger criteria being met; and
      (c) send to the software application a message including the updated location information for the mobile station.

18. The article of manufacture of claim 17, wherein:
   the mobile station location request received from the software application includes a position accuracy, and
   the updated location information of the position report message is determined based on a location of a base station which the mobile station is in communication with, when the position accuracy is a coarse position accuracy.

19. The article of manufacture of claim 18, wherein the updated location information included in the position report message includes base station almanac (BSA) data.

20. The article of manufacture of claim 19, wherein the location gateway server is further caused to perform functions to:
   upon receiving the position report message, determine a type of location information to send to the software application; and
   convert the updated location information received in the position report message into a latitude/longitude type of information prior to sending the updated location information to the software application.

21. The article of manufacture of claim 17, wherein:
   the mobile station location request received from the software application includes a position accuracy, and
   the updated location information of the position report message is determined using a global positioning satellite (GPS) system, an assisted GPS system, or an advanced forward link triangulation (AFLT) procedure, when the position accuracy is a granular position accuracy.

22. The article of manufacture of claim 17, wherein:
the updated location information is provided at a granular position accuracy when a global positioning satellite (GPS) system or an assisted GPS system is available for position determination, and
upon determining that the GPS system or the assisted GPS system is not available for position determining, the updated location information is provided at a coarse position accuracy.

23. The article of manufacture of claim 17, wherein the location gateway server is further caused to perform functions to:
send a request message to a home location register (HLR) associated with the mobile station to obtain identification of a mobile switching center (MSC) serving the mobile station;
upon receiving a response message from the HLR identifying the MSC serving the mobile station, compare a network address for the identified MSC to network addresses for MSCs of wireless mobile communication network supporting location determination to determine whether the mobile station is connected to a wireless mobile communications network supporting location determination; and
upon determining that the mobile station is not currently connected to a wireless mobile communication network supporting a location determination having a coarse accuracy, causing the mobile station to provide mobile station location information having a granular location accuracy.

24. The article of manufacture of claim 17, wherein the trigger criteria associated with the request for triggered notifications of the mobile station location are selected from the group consisting of: a trigger based on a geographic location of the mobile station, a trigger based on a scheduled time, and a trigger based on a periodically occurring time.

* * * * *